United States Patent
Hughes et al.

(10) Patent No.: US 8,936,404 B2
(45) Date of Patent: Jan. 20, 2015

(54) METHOD, APPARATUS AND SYSTEM FOR SELF-ALIGNING COMPONENTS, SUB-ASSEMBLIES AND ASSEMBLIES

(75) Inventors: Patrick Joseph Hughes, Berrings Village (IE); Grace Marie Jordan, Dublin (IE); Alan Michael Lyons, Malahide (IE)

(73) Assignee: Alcatel Lucent, Boulogne-Billancourt (FR)

( * ) Notice: Subject to any disclaimer, the term of this patent is extended or adjusted under 35 U.S.C. 154(b) by 1234 days.

(21) Appl. No.: 11/430,352

(22) Filed: May 9, 2006

(65) Prior Publication Data

US 2007/0263963 A1 Nov. 15, 2007

(51) Int. Cl.
  *G02B 6/42* (2006.01)
  *G02B 26/08* (2006.01)
  *G02B 6/32* (2006.01)
  *G02B 6/35* (2006.01)

(52) U.S. Cl.
  CPC .............. *G02B 26/0891* (2013.01); *G02B 6/32* (2013.01); *G02B 6/3508* (2013.01); *G02B 6/3526* (2013.01); *G02B 6/3588* (2013.01); *G02B 6/4226* (2013.01)
  USPC ............................................................ 385/90

(58) Field of Classification Search
  USPC .................. 385/25, 31, 52, 90, 140
  See application file for complete search history.

(56) References Cited

U.S. PATENT DOCUMENTS

| | | | |
|---|---|---|---|
| 3,337,287 A * | 8/1967 | Lessman | 352/244 |
| 5,311,410 A * | 5/1994 | Hsu et al. | 362/552 |
| 5,553,182 A | 9/1996 | Haake | |
| 5,661,597 A * | 8/1997 | Sugawara | 359/362 |
| 6,285,504 B1 | 9/2001 | Diemeer | |
| 6,583,904 B1 * | 6/2003 | Mahlab et al. | 398/129 |
| 6,590,697 B2 | 7/2003 | Vaganov | |
| 2001/0017956 A1 | 8/2001 | Goodman et al. | |
| 2002/0181843 A1 | 12/2002 | Vaganov | |
| 2004/0096176 A1 * | 5/2004 | Mottier | 385/140 |
| 2005/0195687 A1 * | 9/2005 | Woo | 367/149 |
| 2006/0013535 A1 * | 1/2006 | Fushimi et al. | 385/38 |
| 2007/0040481 A1 * | 2/2007 | Ogino | 310/800 |

FOREIGN PATENT DOCUMENTS

| | | |
|---|---|---|
| CA | 2 307 249 A1 | 10/2000 |
| EP | 0 859 260 A | 8/1998 |
| EP | 1 048 962 A | 11/2000 |
| JP | 2003-248135 A | 9/2003 |

(Continued)

OTHER PUBLICATIONS

Michael C. Roggemann et al., Micro-electro-mechanical deformable mirrors for aberration control in optical systems. Optical and Quantum Electronics 31: 451468, 1999, © 1999 Kluwer Academic Publishers. Printed in the Netherlands.

(Continued)

*Primary Examiner* — Sarah Hahm
(74) *Attorney, Agent, or Firm* — Wall & Tong, LLP

(57) ABSTRACT

Method, apparatus and system for self-aligning components, sub-assemblies and/or assemblies wherein actuators are used to physically move the components, sub-assemblies and/or assemblies such that an appropriate alignment is provided. The efficiency of the alignment may be determined with respect to a qualitative measurement (e.g., bit error rate, optical intensity and the like) of an output signal.

16 Claims, 5 Drawing Sheets

(56) References Cited

FOREIGN PATENT DOCUMENTS

| JP | 2003 270560 A | 9/2003 |
|---|---|---|
| WO | WO 2005/085924 A | 9/2005 |
| WO | WO 2005085930 A1 * | 9/2005 |

OTHER PUBLICATIONS

K. Baker, et al., Design and Progress toward a multi-conjugate adaptive optics system for distributed aberration correction, Aug. 18, 2004, Lawrence Livermore National Laboratory, UCRL-PROC-206126. SPIE Denver, CO. United States. Aug. 2, 2004 through Aug. 6, 2004.

International Search Report and Written Opinion in corresponding PCT/US2007/010369, Jan. 28, 2008, Lucent Technologies Inc.

L. Y. Lin et al., "Surface-Micromachines Micro-XYZ Stages for Free-Space Microoptical Bench," IEEE Photonics Technology Letters, vol. 9, No. 3, Mar. 1997, pp. 345-347.

* cited by examiner

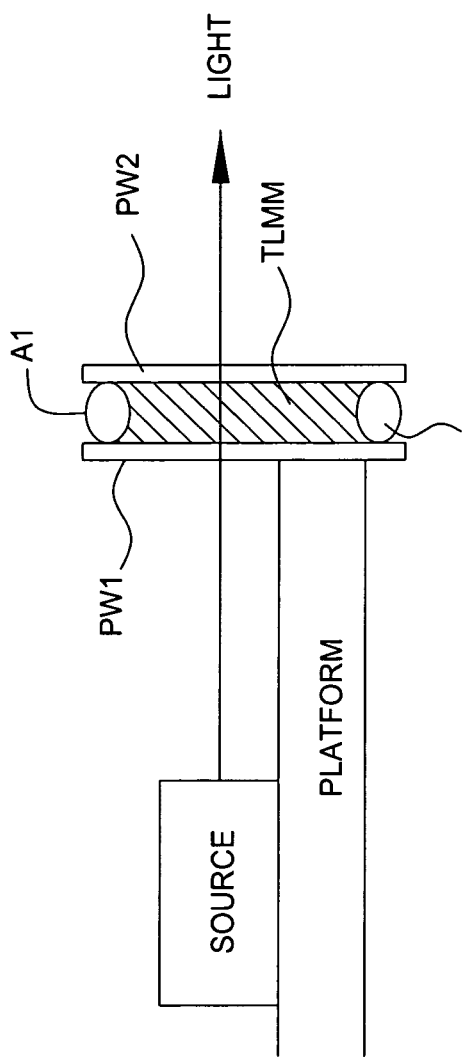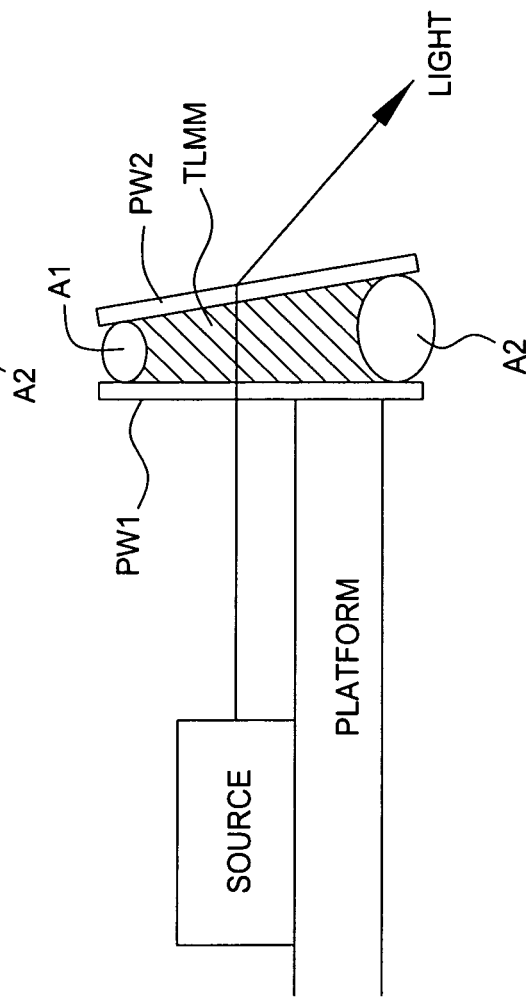
FIG. 5A
FIG. 5B

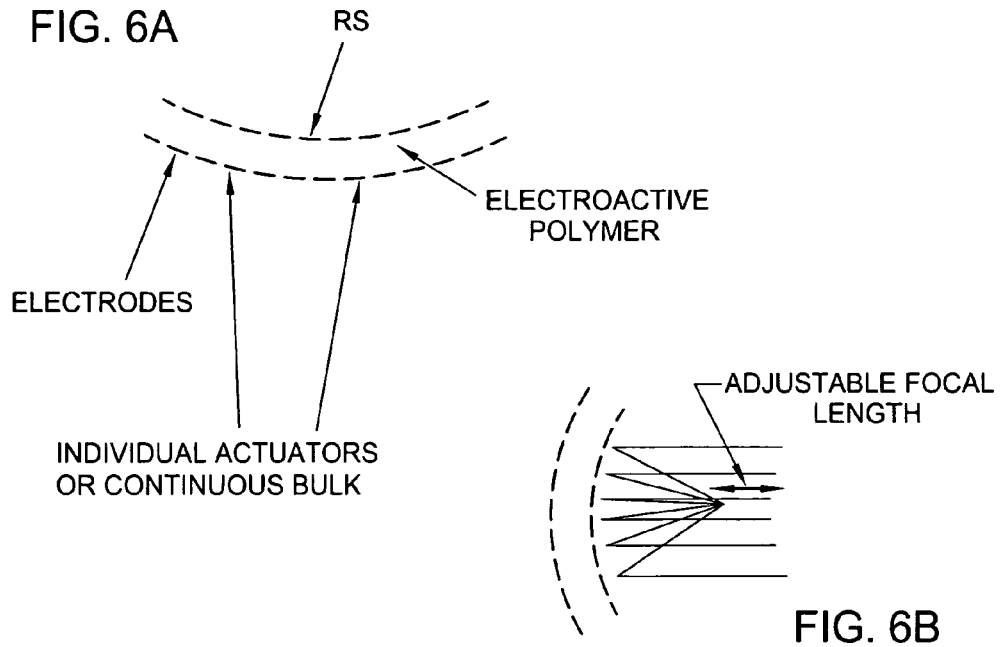
FIG. 6A
FIG. 6B
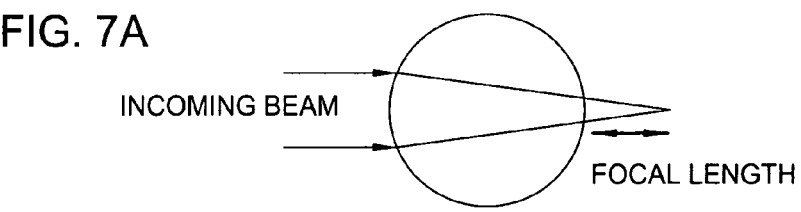
FIG. 7A
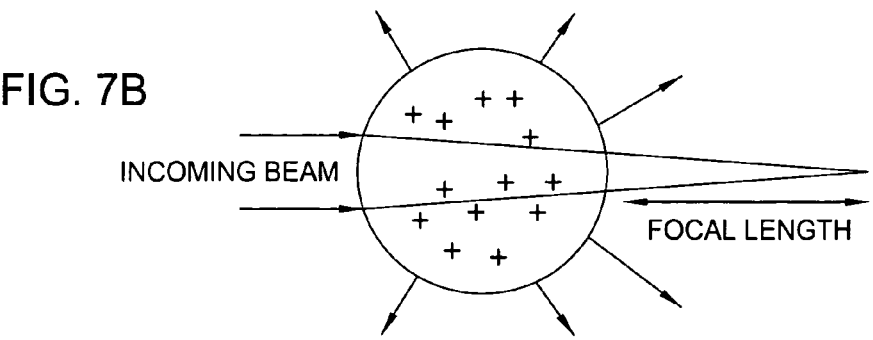
FIG. 7B

US 8,936,404 B2

METHOD, APPARATUS AND SYSTEM FOR SELF-ALIGNING COMPONENTS, SUB-ASSEMBLIES AND ASSEMBLIES

FIELD OF THE INVENTION

The present invention relates generally to the assembly of alignment-critical components, sub-assemblies and assemblies and, more particularly, to self-alignment of such components, sub-assemblies and assemblies for directed energy systems such as optical systems.

BACKGROUND OF THE INVENTION

Currently, a disproportionately large percentage of the cost associated with the production of optical communication packages is taken up with the high precision alignment that is required between micron-sized optical elements within the module such as laser diodes and single-mode fibres. Due to the high degree of positional accuracy that must be achieved, relatively slow labour intensive techniques are often used for producing such packages. This slow and costly approach is a major obstacle to the production of low cost telecommunication equipment. Alternatives to this approach have been proposed and/or implemented.

One alternative approach provided by Axsun Corporation of Billerica, Mass., USA utilizes specialized deformable microelectromechanical systems (MEMS) submounts for each of the components. These submounts are placed with a pick and place machine on the substrate and bonded in place. Subsequently, very precise positioning of the submount is achieved with the use of a specialist robotic arm which applies a force to the submount to deform it in a known manner such that the desired position or alignment is achieved. This technique suffers from a large initial investment, long assembly and set-up times. Moreover, the large variety of small volume components typically used to build specialized equipment limits the cost-effective use of this approach. In addition, this technique relies heavily on known tuning curves which are specific to the customized sub-mount making this technique inflexible in regard to adapting it to different devices.

Several studies investigate the use of MEMS thermomechanical actuators for sub-micron positional control of optical fibers (See for example, R. R. A. Syms, H. Zou, D Uttamchandani, J. Stagg, J. MicroMech. Microeng. 14 1633 (2004), Active Fiber Optic MEMS Aligner Boeing—U.S. Pat. No. 5,553,182) The methods described in these studies allow small adjustments of the position of a fiber end to improve coupling efficiency with a light source or another fiber. Furthermore, Lin et al. (L. Y. Lin, J. L. Shen, S. S. Lee, M. C. Wu, IEEE Photon. Tech. Lett. 9, 345 (1997)) have demonstrated the use of MEMS electrostatic actuators in XYZ stages for free space beam steering.

The major disadvantage of the first two approaches to optical package manufacture described above is one of cost, both being labor and/or capital intensive. In addition, both of these techniques are limited in their diversity because they both use external manipulation to alter the position of the component.

The MEMS devices also have significant disadvantages associated with them. The fiber positioning devices are capable of moving a single fiber in only one direction and for only a small distance, on the order of twenty micrometers. The method proposed by Lin et al. suffers from high cost, complexity and reliability issues. Finally, the MEMS based devices which operate using electrostatic actuation have high voltage requirements and they are typically capable of only small displacements. The MEMS devices operating on the basis of a thermomechanical response typically dissipate a considerable amount of energy of the order of 0.3 watts per micron of displacement.

SUMMARY

Various deficiencies of the prior art are addressed by the present invention of a method to align at least two directed energy processing components to optimize an energy coupling efficiency between them, the method comprising urging at least one of the directed energy components using a controlled actuator to translate thereby a position of the component, the actuator being controlled in response to a determined energy coupling level.

BRIEF DESCRIPTION OF THE DRAWINGS

The teachings of the present invention can be readily understood by considering the following detailed description in conjunction with the accompanying drawings, in which:

FIG. 5 depicts a schematic representation of an adjustable component sub-mount according to a second embodiment of the invention;

FIG. 6 depicts a schematic representation of an adjustable component sub-mount according to a third embodiment of the invention; and FIG. 7 depicts a schematic representation of a balloon lens.

To facilitate understanding, identical reference numerals have been used, where possible, to designate identical elements that are common to the FIGS.

DETAILED DESCRIPTION OF THE INVENTION

The invention will be primarily described within the context of an integration of actuator devices with optical components such that the optical components may be translated to optically align themselves in a desired manner after mounting within an assembly or piece of equipment. However, it will be appreciated by those skilled in the art informed by the teachings herein that the invention is also applicable to any component or subassembly in which automatic post-mounting alignment is desired. For example, optical energy, microwave energy and other directed energies or signals associated with components in which post-mounting alignment may be desirable.

Within the context of the present invention, one or more optical components are packaged together with actuators adapted to modify optical paths or alignment associated with the optical components. In this manner, the ability to re-adjust position and change beam direction is inherently built into the individual components in the package. This allows use of conventional high speed manufacturing processes such as surface mount technology for initial package assembly. Using integrated actuated optical elements, the individual components within the package can then re-align themselves to the high precision required. In order to achieve this, several adjustable optical elements are needed which form the main body of the invention. A collection of such adjustable components is described herein and which can steer the optical beam in free space and also adjust the position of sources and receivers. For example, active (1) sub-mounts which can adjust the actual position and orientation of an element such as a fiber, source or lens; (2) an adjustable prism which can steer a beam by actively changing the prism angle; (3) a deformable mirror based on an array of actuators which is capable of changing beam direction and additionally, adjusting its own focal length; and (4) an adjustable lens where the adjustment comes from the injection of charge into an ionic electroactive polymer.

Figure 1:
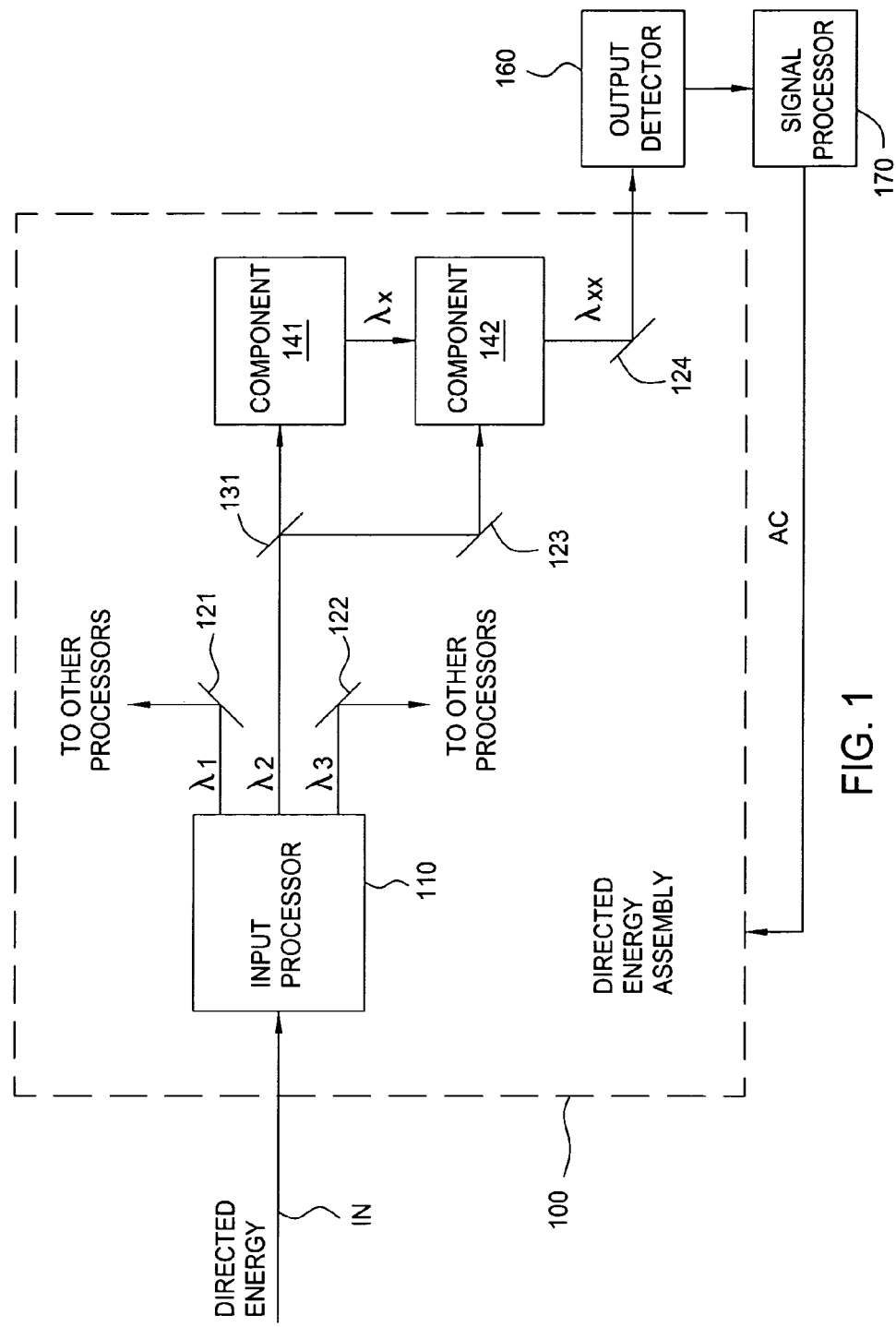
FIG. 1 depicts a high-level block diagram of a directed energy assembly 100 useful in understanding the present invention.

FIG. 1 depicts a high-level block diagram of a directed energy assembly 100 useful in understanding the present invention. Specifically, the assembly 100 of FIG. 1 directs energy input signal IN for processing to produce a directed energy output signal OUT. While described within the context of optical energy, the invention addresses component alignment issues associated with any directed energy.

The directed energy assembly 100 comprises an input processor 110, four energy diverters (e.g., mirrors) 121-124, and energy splitter (e.g., optical splitter) 131, a first component 141 and a second component 142. The directed energy assembly 100 cooperates with an output detector 160 and a signal processor 170.

The first 141 and second 142 components may comprise any directed energy or optical component in which alignment of input and/or output energy is desired. While not shown, each of the first in 141 and second 142 components are formed in a manner which integrates respective actuators such that the position of the components with respect to received or transmitted energy may be adapted. Various embodiments of integral component/actuator topologies will be described in more detail below with respect to the remaining FIGS.

A directed energy or optical input signal IN is received by the input processor 110 and converted into three signals intended for further processing; namely, optical wavelength signals $\lambda_1$, $\lambda_2$ and $\lambda_3$. Optical wavelength signals $\lambda_1$ and $\lambda_3$ are coupled to other processing elements or components (not shown) via, respectively, the first 121 and second 122 mirrors. Optical wavelength signal $\lambda_2$ is coupled to optical component 141 via splitter 131. A split portion of optical wavelength signal $\lambda_2$ from splitter 131 is coupled to component 142 via third mirror 123.

Component 141 provides an output optical signal $\lambda_x$ that is coupled to component 142. Component 142 provides an output optical signal $\lambda_{xx}$ that is coupled to fourth mirror 124 for subsequent output from the directed energy assembly 100.

Component 141 is aligned with its received optical signal $\lambda_2$ via one or more actuators (not shown). Component 142 is aligned with one or both of its received optical signals $\lambda_x$ and $\lambda_2$ via one a more actuators (not shown). Components 141 and 142 may include actuators that align input signals, output signals or any combination of input and output signals or the component itself relative to either input or output signals.

The actuators associated with components 141 and 142 are responsive to actuator control signal AC received by the directed energy assembly 100. The actuator control signal AC may comprise electrical, optical, thermal or other control signal adapted to influence one or more actuators associated with the components on the directed energy assembly 100. In the case of a thermal actuator, a heating or cooling element may be associated with the actuator, such heating or cooling element being controlled by the actuator control signal AC.

The directed energy assembly 100 of FIG. 1 comprises, illustratively, an optical assembly or sub-assembly, a microwave or millimeter wave assembly or subassembly and the like. The depicted assembly as described includes components (141, 142) integrated with actuators such that a preferred beam directionality may be achieved. While not shown, the directed energy assembly itself may have associated with it one or more input signal actuators and/or one or more output signal actuators which, respectively, provide assembly-level alignment for the input and output signals to achieve, for example, maximum power transfer.

Optionally, the output signal produced by the directed energy assembly 100 is processed by an output detector 160 and a signal processor 170. The output detector monitors the directed energy assembly output to determine a qualitative parameter associated with that output, such as a power level, bit error rate (BER) and the like. The output detector 160 may comprise a photo detector, forward error correction (FEC) processor and the like.

The signal processor 170 (in this embodiment) produces the actuator control signal AC. The signal processor may comprise a digital signal processor (DSP) or other computing mechanism. The signal processor 170 adapts the actuator control signal AC in response to the determined qualitative parameter. In this manner, a feedback loop is provided wherein one or more actuators within the directed energy assembly 100 are adapted in a manner tending to improve the qualitative parameter of the directed energy assembly output signal. Essentially, an active control loop monitors the optical signal and causes adjustments in the actuators within the package, optimizing the optical signal in terms of transmission or another parameter associated with the signal such as BER.

Generally speaking, one or more actuators are positioned proximate a directed energy processing component to provide thereto a force adapted to enable a preferred alignment of the component. If preferred alignment of the component is the alignment that provides, for example, an output signal having a qualitative parameter above a threshold level (e.g., a bit error rate below a threshold bit error rate, and optical intensity above an optical intensity threshold level and so on), the signal processor adjusts one or more actuators in response to the detected qualitative parameter such that the actuator adjustments tend to improve the detected qualitative parameter (e.g., lower a bit error rate or increase and optical intensity).

Another embodiment is a self-aligning package which is assembled initially using SMT (surface mount technology) and which tunes itself without the intervention of a human operator or external mechanical manipulation. This package may also be capable of re-adjusting itself if there is a drop in optical signal due to external influence such as mechanical shock or reconfiguring itself in the event of failure of an individual component. In this embodiment, the functionality described with respect to the output detector 160 and signal processor 170 may be included within the directed energy assembly itself. Thus, as described below with respect to a hierarchy of components, assemblies and the like, each component, subassembly or assembly within a directed energy systems such as an optical system may include self-alignment processing functions such that the speed of assembly, testing and deployment of directed energy products may be dramatically increased while simultaneously increasing desired qualitative parameters.

Figure 3A:
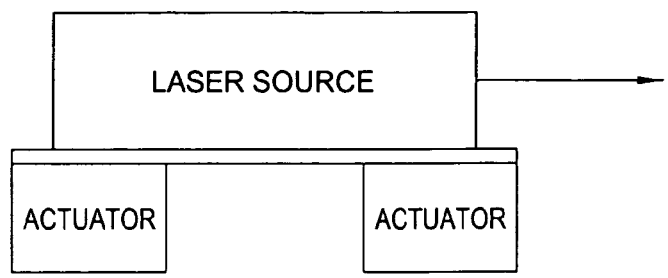
Figure 3B:
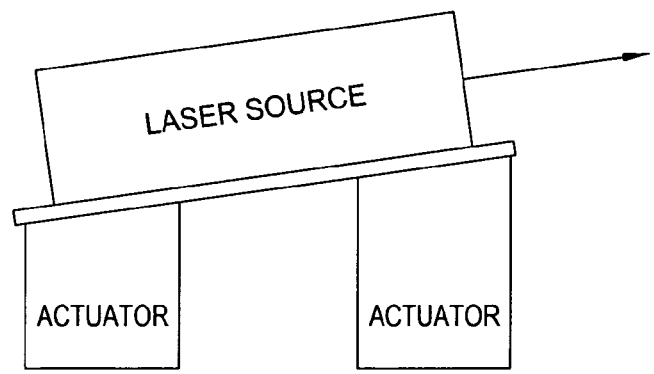
Figure 4:
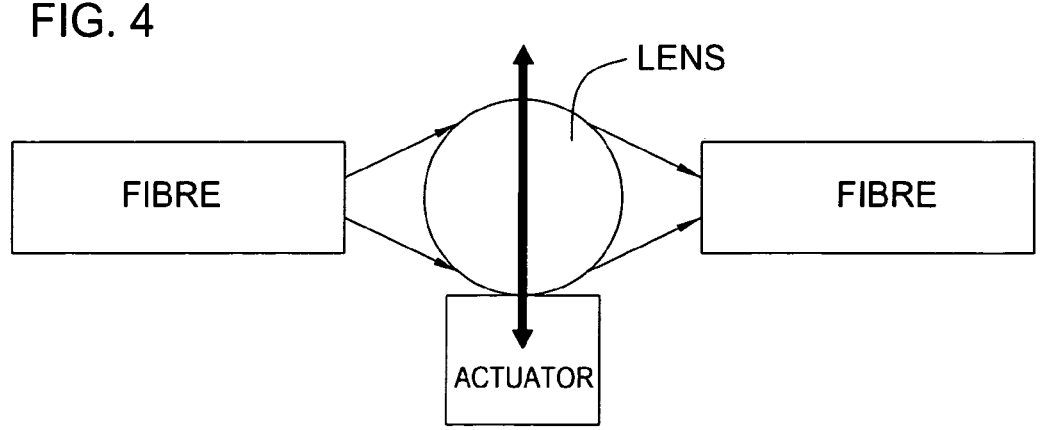

FIGS. 2-4 depict schematic representations of adjustable component sub-mounts according to first embodiment of the invention. Each of these figures depicts a component sub-mount in which a component such as an optical component is physically urged in a particular direction using one or more actuators included within the sub-mount. Thus, a simplified alignment of an optical component within an assembly is realized by controlling one or more actuators included within a-sub mount with the optical component.

Figure 2A:
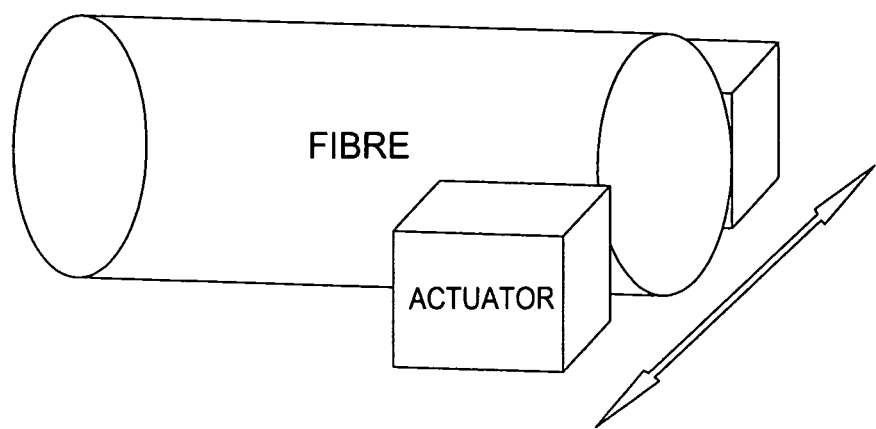
FIGS. 2-4 depict schematic representations of adjustable component sub-mounts according to first embodiment of the invention.
Figure 2B:
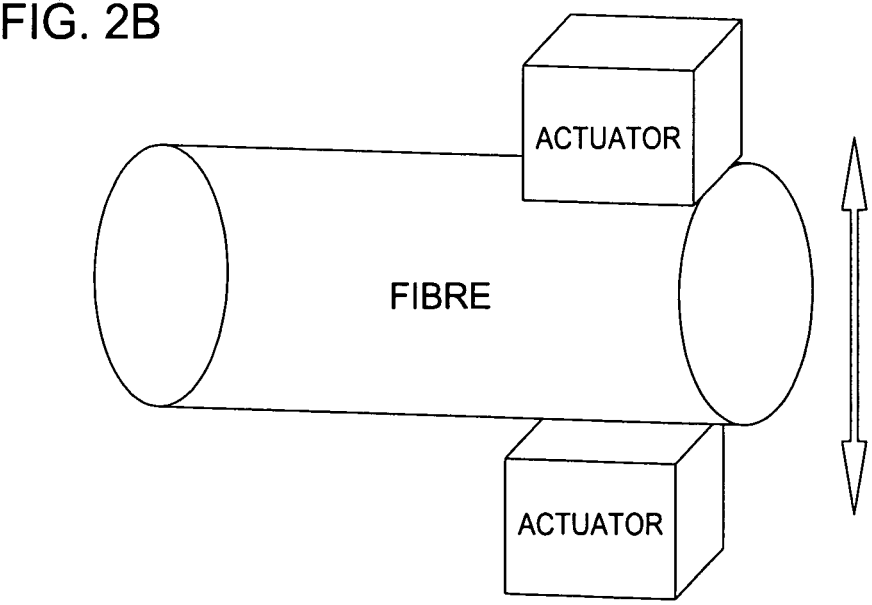

FIG. 2 depicts an adjustable component sub-mount comprising a fiber positioner. Specifically, an optical fiber is physically mounted between two actuators in either a horizontal arrangement (x-axis) per FIG. 2A or vertical arrangement (y-axis) per FIG. 2B. In the arrangement of FIG. 2A, the actuators are used to adapt the position of the optical fiber along the x-axis. Similarly, in the arrangement of FIG. 2B, the actuators are used to adapt the position of the optical fiber along the y-axis. In a further embodiment, both x-axis and y-axis actuators are used such that two dimensional positioning of the fiber is provided via control of the actuators.

FIG. 3 depicts an adjustable component sub-mount comprising a laser source sub mount, such as for a laser diode. Specifically, a laser source is physically mounted above the two actuators, where a proximal portion of the laser source is above the first actuator and the distal portion of a laser source is above a second actuator. The laser source may be mounted directly upon the actuators or upon a platform or substrate region that rests upon the actuators. FIG. 3A depicts the laser source sub-mount in a quiescent or relaxed state (i.e., the actuators are supporting the laser source such that a substantially horizontal beam is provided). FIG. 3B depicts the laser source sub-mount in an active state in which the actuators are adapted to raise the transmitting end of the laser source above the non-transmitting end of the laser source such that a beam above horizontal is provided. It is noted that the actuators may be used to provide an output beam having an angle above or below horizontal, depending upon the relative deflection in part to the laser source by the actuators. Multiple actuators are optionally combined such that motion about two or more axis, such as pitch and roll, is achieved.

FIG. 4 depicts an adjustable component sub-mount comprising lens sub mount, such as for a lens adapted to couple light between two optical fibers. As depicted in FIG. 4, the lens comprises a substantially spherical object which, in response to pressure from an actuator, either is translated or adapts its optical properties such that light received from a first fiber may be directed towards different points proximate a second fiber. While shown as a substantially spherical object, it will be appreciated that the invention is useful within the context of any lens structure (e.g., spherical, elliptical, prism and the like) that may be adapted in response to the urging of actuator. Thus, the "ball lens" depicted in FIG. 4 is simply one of a plurality of optical components that may be used to increase coupling efficiency between optical fibers. A ball lens will be described in more detail below with respect to FIG. 7.

FIG. 5 depicts a schematic representation of an adjustable component sub mount according to one of the second embodiment of the invention. As shown in FIG. 5, the adjustable component sub-mount comprises a laser source sub mount, such as for a laser diode. Specifically, a laser source and adjustable prism are operably positioned via a platform such that light provided by the source passes through the prism.

The adjustable prism comprises two transparent prism walls (e.g., glass, plastic and the like) denoted as PW1 and PW2 having disposed there between a transparent low modulus material denoted as TLMM and at least one actuator A. In the embodiment of FIG. 5, two actuators denoted as A1 and A2 are shown as being positioned between the transparent prism walls at an upper portion (A1) and a lower portion (A2). All that is necessary is that one or more actuators are operable to perturb the normally coplanar transparent prism walls such that the path of light produced by the source may be controlled by changing, for example, the incident angle of such light upon one or both of the prism walls.

FIG. 5A depicts the adjustable prism in a quiescent or relaxed state (i.e., the actuators are supporting the laser source such that a substantially horizontal beam is provided). In this state, light produced by the source passes through the first prism wall, TLMM and second prism wall in a substantially straight manner.

FIG. 5B depicts the adjustable prism in an active state in which second actuator A2 has expanded such that the distance between the prism walls progressively increases from the wall portions proximate actuator A1 to the wall portions proximate actuator A2. It is noted that the transparent low modulus material preferably adapts to the space available between the two prism walls such that light passing through the prism only passes through prism wall material and TLMM material. It is also noted that while FIG. 5 depicts second prism wall PW2 being displaced by an actuator, either or both of the prism walls may be so displaced. Such displacement may occur using either or both of the actuators. Moreover, additional actuators are optionally included within the adjustable prism depicted in FIG. 5. For example, additional actuators may be disposed within the prism walls to adjust the relative position of the walls with respect to each other in any direction. That is, in addition to or instead of the depicted "top" and "bottom" actuators of FIG. 5, "left" and/or "right" actuators are optionally provided in various configurations according to the invention.

The various embodiments of the invention described above comprise assemblies or apparatus including a component benefiting from alignment and one or more actuators operative to achieve the alignment. The actuators may be realized using any of several technologies. For example, a thermal actuator may be realized using a thermomechanical polymer which expands or contract in a predictable manner in response to heat. An electrical actuator may be realized using electroactive polymers, piezoceramics and the like which expand or contract in a predictable manner in response to a voltage or current. Other actuators include MEMS devices, electromagnetic actuators and the like. Typically, the amount of mechanical adjustment necessary to achieve an optical realignment or other effect is relatively small, on the order of a few tens of microns. However, these few tens of microns may make an enormous difference in terms of power transfer, efficiency and general operation of the optical assembly utilizing components adapted according to the teachings of the present invention.

It is noted that MEMS type devices typically require 10-100 Volts and provided displacement of 10-20 microns. More specifically, electrostatic actuators work best with displacements of the order of a few microns. Comb drive actuators can be made with travels up to 100 microns, but voltages become high and lateral stability degrades. The springs supporting the combs are also large and very fragile. By contrast, a polymer actuator is capable of more than 40 micron displacement with less than 2 volts. Using polymers that expand/contract due to light, heat or electrical power requires no moving parts such as cogs, gears, hinges, gimbals etc. Such polymers are capable of, for example a 40 micron range of motion with 200 nm precision.

FIG. 6 depicts a schematic representation of an adjustable component sub mount according to another embodiment of the invention. As shown in FIG. 6, the adjustable component sub-mount comprises an actuator array mirror in which a light reflective surface (or, more generally, an energy reflective surface) is adapted via an array of actuators to change thereby the focal point of the mirror. The mirror is formed using a flexible reflective membrane, which is mounted on an array of closely spaced actuators. In one embodiment, the actuator array comprises an array of electrodes mounted on a single piece of electroactive polymer material. Applying a voltage to the electrodes results in deformation of the polymer in a controlled manner, which adjusts the curvature of the reflective membrane and, thereby, the focal point associated with the mirror. This adjustment may be symmetric, resulting in a change of focal length of the mirror. This adjustment may be asymmetric, resulting in a lateral translation of the beam focus point and/or a change in focal point. In another embodiment, the single piece of electroactive polymer is replaced by an array of individual electrodes separated by small gaps such as gaps of air or some other dielectric material.

FIG. 7 depicts a schematic representation of a balloon lens such as discussed above with respect to FIG. 4. Specifically, the balloon lens comprises an adjustable electroactive lens in which, illustratively, a wet/ionic electroactive polymer is enclosed in a flexible balloon-like electrode. Upon injection of charge into the electroactive polymer, the material expands or contracts due to the mutual repulsion of the injected charge, which expansion or contraction will change the shape of the lens and, hence, it's focal length. In addition, the injection of charge will change the refractive index of the electroactive polymer which also results in a change in the focal length of the lens. Thus, a change in focal length is achieved using two mechanisms; namely, a geometric adaptation in the shape of the lens and/or a modification in the refractive index of the material forming the lens. Moreover, the balloon lens may be used as an actuation device due to the expansion and contraction properties associated with it.

FIG. 7A depicts a balloon lens in a quiescent or relaxed state (i.e., there is no charge injected to adapt the shape and/or refractive index of the lens). In this state incoming beam of light is incident upon the lens surface and depicted as converging to appoint beyond the lens, where in the distance between the focal point and outer surface of the lens is denoted as the focal length. FIG. 7B depicts the balloon lens in an active state in which a charge has been injected such that the lens has increased in size or "ballooned." In this state, the incoming beam converges to a different focal point. Specifically, by increasing the size and/or refractive index of the balloon lens, the focal length is increased as shown. In this manner, the relationship between injected charge and focal length may be advantageously applied to adapt the point of focus of an optical signal.

The balloon lens described herein with respect to FIG. 7 has applicability within the context of, for example, the lens for coupling optical energy between optical fibers discussed above with respect to FIG. 4. Specifically, the controlled injection of charge into the balloon lens is used to adapt the focal length associated with the lens such that a maximum amount of light provided by the output of a first optical fiber may be focused upon an input of a second optical fiber.

The above-described structures are advantageously adapted to the rapid assembly of optical and other directed energy sub-mounts and sub-assemblies, as well as higher level assemblies and equipment or portions of equipment. In one embodiment, a hierarchical assembly and testing scheme is provided. Specifically, each of the components having associated with it a critical alignment parameter includes upon its respective sub-mount one or more actuation means adapted to controllably compensate for alignment errors. At a next level, the various sub-mounts are included within a higher level sub-assembly or assembly. This sub-assembly or assembly may also have associated with it one or more actuation means adapted to controllably compensate for its own alignment errors. That is, to the extent that optical or directed energy alignment is necessary between sub-assemblies, the inclusion of actuation means within one or more of the sub-assemblies enables the controllable alignment of energy directed between the sub-assemblies. Finally, multiple components and/or multiple sub-assemblies may be combined to produce network elements, computing elements, optical or directed energy transmission elements and the like which may be rapidly configured and tested to ensure appropriate operation. Computer-controlled testing of the various hierarchical elements with integrated actuation means provides a dramatic decrease in the costs associated with components, sub-assemblies and so on at each level of the particular hierarchy used to implement an optical or other directed energy device.

In addition to the above embodiments of the invention, various other embodiments are contemplated by the inventors.

In one embodiment, the invention is utilized to provide an optical package in which the components requiring critical alignment have integrated actuators (as actuated submounts or micropositioners) that can be controlled in such a way as to compensate for any offset in the initial placement of the components relative to each other thus optimising the optical signal through the package.

In another embodiment, the invention is utilized to provide an optical package containing beam steering devices that can steer the beam using actuators to compensate for initial alignment offset. For example prism, lens or mirror whose properties such as position and shape can be adjusted so as to optimise the optical signal through the package.

In various embodiments, actuators are provided that have sufficient range and operating characteristics so as to be suitable for use in an application where the alignment offsets result from placement using a high speed manufacturing process such as SMT (surface mount technology) and that can operate at powers/voltages that are compatible with standard CMOS technology. In addition, various embodiments utilize actuators that can be easily integrated into optical packages without need for a high degree of processing (which would offset the cost saving by adopting this approach)—for example the use of polymer actuators. Polymer actuators can have high strain as compared to piezoelectric actuators, low power consumption/voltage and low processing requirements compared to electrostatic actuators used for MEMS.

The above-described embodiments of the invention may be implemented within the context of methods, computer readable media and computer program processes. Generally speaking, methods according to the invention may be implemented using computing devices having a processor as well as memory for storing various control programs, other programs and data. The memory may also store an operating system supporting the programs. The processor cooperates with conventional support circuitry such as power supplies, clock circuits, cache memory and the like as well as circuits that assist in executing the software routines stored in the memory. As such, it is contemplated that some of the steps discussed herein as software processes may be implemented within hardware, for example as circuitry that cooperates with the processor to perform various steps. Input/output (I/O) circuitry forms an interface between the various functional elements communicating with the device.

A computing device is contemplated as, illustratively, a general purpose computer that is programmed to perform various control functions in accordance with the present invention, the invention can be implemented in hardware as, for example, an application specific integrated circuit (ASIC)

or field programmable gate array (FPGA). As such, the process steps described herein are intended to be broadly interpreted as being equivalently performed by software, hardware or a combination thereof.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. Apparatus, comprising:
   a directed energy processing component having associated with it a preferred alignment to one or both of received energy and provided energy;
   at least one polymer actuator, positioned proximate the directed energy processing component to provide thereto a force adapted to enable the preferred alignment;
   a detector, for detecting a qualitative parameter associated with the provided energy; and
   a processor, for adjusting the actuator in a manner tending to improve the detected qualitative parameter;
   wherein the directed energy processing component comprises a prism having a substantially transparent low modulus material disposed between two substantially transparent plates, at least one plate being positioned into a non-coplanar relationship with the other plate in response to urging by the at least one polymer actuator such that a beam passing through the plates changes direction due to refraction from surfaces not normal to the beam propagation direction;
   wherein, when the two plates are positioned into a non-coplanar relationship with respect to each other, the transparent low modulus material adapts to space available between the two plates such that a beam passing through the prism only passes through the plates and the transparent low modulus material.

2. The apparatus of claim 1, further comprising:
   mounting means, adapted to secure the directed energy processing component and the at least one actuator to provide thereby an adjustable component sub-mount.

3. The apparatus of claim 1, further comprising:
   a common platform having a laser source mounted thereon such that the common platform provides a sub-mount for the laser source, wherein the laser source provides the beam;
   wherein the directed energy processing component and the at least one polymer actuator are operably positioned via the common platform such that the beam provided by the source passes through the prism.

4. The apparatus of claim 1, wherein the directed energy processing component and the at least one polymer actuator are formed on a common platform configured for installation within a directed energy processing assembly.

5. The apparatus of claim 4, wherein the directed energy processing assembly includes the detector and the processor.

6. The apparatus of claim 4, wherein the directed energy processing assembly includes a plurality of platforms, each of which includes a directed energy processing component and at least one respective actuator, the directed energy processing assembly being configured to adjust each of the directed energy processing components in a manner tending to provide respective preferred alignments.

7. The apparatus of claim 4, wherein the directed energy processing assembly has associated with it at least one proximately positioned actuator configured to enable a preferred alignment to one or both of energy received or provided by the directed energy processing assembly.

8. The apparatus of claim 1, wherein the at least one polymer actuator comprises a thermomechanical polymer actuator or an electroactive polymer actuator, the at least one polymer actuator being effective over an alignment range including at least an initial placement error.

9. The apparatus of claim 1, wherein said at least one polymer actuator is responsive to a control signal provided by said processor, said control signal determined with respect to an energy coupling level between the directed energy processing component and one or both of an input signal and an output signal.

10. The apparatus of claim 1, wherein said qualitative parameter comprises a bit error rate.

11. The apparatus of claim 1, wherein said qualitative parameter comprises an energy intensity level.

12. An optical assembly, comprising:
    a plurality of optical components, each of said optical components being associated with at least one actuator;
    wherein at least one of the plurality of optical components comprises a prism having associated with it a preferred alignment to one or both of received energy and provided energy;
    wherein the at least one actuator associated with the prism comprises a polymer actuator positioned proximate the prism for providing thereto a force adapted to enable the preferred alignment;
    a detector for detecting a qualitative parameter associated with the provided energy; and
    a processor configured to provide a control signal to the at least one actuator to urge said associated optical component from an initial placement optical alignment to an appropriate optical alignment, the processor further configured for adjusting the polymer actuator in a manner tending to improve the detected qualitative parameter; and
    wherein the prism has a substantially transparent low modulus material disposed between two substantially transparent plates, at least one plate being positioned into a non-coplanar relationship with the other plate in response to urging by the polymer actuator such that a beam passing through the plates changes direction due to refraction from surfaces not normal to the beam propagation direction;
    wherein, when the two plates are positioned into a non-coplanar relationship with respect to each other, the transparent low modulus material adapts to space available between the two plates such that a beam passing through the prism only passes through the plates and the transparent low modulus material.

13. The optical assembly of claim 12, wherein another one of the plurality of optical components comprises an optical fiber, wherein the at least one actuator associated with the optical fiber is adapted to urge one end of the optical fiber in at least one direction.

14. The optical assembly of claim 12, wherein another one of the plurality of optical components comprises a lens adapted to couple optical energy between two optical fibers, wherein a focal point associated with the lens is adapted by at least one of:
- deforming the lens in response to urging by the at least one actuator associated with the lens; and
- translating the lens in response to urging by the at least one actuator associated with the lens.

15. The optical assembly of claim 12, wherein the polymer actuator comprises a thermomechanical polymer actuator, the polymer actuator being effective over an alignment range including at least an initial placement error.

16. The optical assembly of claim 12, wherein the polymer actuator comprises an electroactive polymer actuator, the polymer actuator being effective over an alignment range including at least an initial placement error.

* * * * *